United States Patent [19]
Sjödin

[11] Patent Number: 6,097,948
[45] Date of Patent: Aug. 1, 2000

[54] SIGNALING CHANNEL FIREWALL FOR COMMUNICATIONS BETWEEN WIRELESS NETWORKS

[75] Inventor: Staffan Sjödin, Stockholm, Sweden

[73] Assignee: Telefonaktiebolaget L M Ericsson (publ), Stockholm, Sweden

[21] Appl. No.: 09/015,772

[22] Filed: Jan. 29, 1998

[51] Int. Cl.[7] .................................................. H04Q 7/22
[52] U.S. Cl. ........................ 455/426; 455/560; 370/467
[58] Field of Search ................................. 455/422, 426, 455/432–433, 435, 552, 560; 370/401, 463, 465–467, 469; 379/229, 230

[56] References Cited

U.S. PATENT DOCUMENTS

| | | | |
|---|---|---|---|
| 5,090,050 | 2/1992 | Heffernan | 455/432 |
| 5,260,987 | 11/1993 | Mauger | 455/560 |
| 5,321,542 | 6/1994 | Freitas et al. | 359/172 |
| 5,325,419 | 6/1994 | Connolly et al. | 455/435 |
| 5,329,573 | 7/1994 | Chang et al. | 455/411 |
| 5,333,185 | 7/1994 | Burke et al. | 379/127 |
| 5,353,331 | 10/1994 | Emery et al. | 455/461 |
| 5,396,543 | 3/1995 | Beeson, Jr. et al. | 455/560 |
| 5,440,613 | 8/1995 | Fuentes | 455/432 |
| 5,499,289 | 3/1996 | Bruno et al. | 379/220 |
| 5,504,804 | 4/1996 | Widmark et al. | 455/414 |
| 5,506,894 | 4/1996 | Billings et al. | 379/127 |
| 5,517,562 | 5/1996 | McConnell | 379/207 |
| 5,537,457 | 7/1996 | Lantto et al. | 455/433 |
| 5,561,840 | 10/1996 | Alvesalo et al. | 455/433 |
| 5,577,029 | 11/1996 | Lu et al. | 455/445 |
| 5,579,372 | 11/1996 | Åström | 455/412 |
| 5,583,916 | 12/1996 | Mäenpää | 455/433 |
| 5,600,705 | 2/1997 | Maenpaa | 455/433 |
| 5,602,903 | 2/1997 | LeBlanc et al. | 455/456 |
| 5,623,601 | 4/1997 | Vu | 395/187.01 |
| 5,629,974 | 5/1997 | Rajala et al. | 455/466 |
| 5,706,286 | 1/1998 | Reiman et al. | 370/401 |
| 5,878,343 | 3/1999 | Robert et al. | 455/424 |
| 5,915,008 | 6/1999 | Dulman | 379/201 |
| 5,917,816 | 6/1999 | Jacobsohn | 370/352 |
| 5,933,784 | 8/1999 | Gallagher et al. | 455/552 |

FOREIGN PATENT DOCUMENTS

| | | | |
|---|---|---|---|
| 9638954 | 5/1996 | WIPO | H04L 12/24 |
| 9750217 | 12/1997 | WIPO | H04L 12/66 |
| 9803028 | 1/1998 | WIPO | H04Q 7/24 |

OTHER PUBLICATIONS

Ericsson Infocom AB 1996; EIN/M–96:175C; Portable SS7 TCAP.

International Telecommunication Union, ITU–T Telecommunication Standardization Sector of ITU; ITU–T Recommendation Q701, Mar. 1993; Specifications of Signalling System No. 7; Functional Description of the Message Transfer Part (MTP) of Signalling System No. 7; pp. 1–20.

International Telecommunication Union, ITU–T Telecommunication Standardization Sector of ITU; ITU–T Recommendation Q700, Mar. 1993; Specifications of Signalling System No. 7; Introduction to CCITT Signalling System No. 7; pp. 1–20.

International Telecommunication Union, ITU–T Telecommunication Standardization Sector of ITU; ITU–T Recommendation Q771, Mar. 1993; Specifications of Signalling System No. 7; Signalling System No. 7—Functional Description of Transaction Capabilities; pp. 1–33.

(List continued on next page.)

*Primary Examiner*—William G. Trost
*Attorney, Agent, or Firm*—Jenkens & Gilchrist, P.C.

[57] ABSTRACT

Selective isolation between a microcellular communication network and a signaling channel of a macrocellular communication network that is relatively larger than the microcellular network is achieved by receiving communication signals from the microcellular network, and using a communications protocol stack to translate the communication signals into further signals for transmission over the signaling channel. Some of the communications signals are translated into the further signals, but some of the communications signals are selectively denied translation into the further signals.

25 Claims, 11 Drawing Sheets

OTHER PUBLICATIONS

International Telecommunication Union, ITU–T Telecommunication Standardization Sector of ITU; ITU–T Recommendation Q772, Mar. 1993; Specification of Signalling System No. 7; Signalling System No. 7—Transaction Capabilities Information Element Definitions; pp. 1–7.

International Telecommunication Union, ITU–T Telecommunication Standardization Sector of ITU; ITU–T Recommendation Q773, Mar. 1993; Specifications of Signalling System No. 7; Signalling System No. 7—Transaction Capabilities Formats and Encoding; pp. 1–33.

International Telecommunication Union, ITU–T Telecommunication Stanardization Sector of ITU; ITU–T Recommendation Q774, Mar. 1993; Specifications of Signalling System No. 7; Signalling System No. 7—Transaction Capabilities Procedures; pp. 1–60.

International Telecommunication Union, ITU–T Telecommunication Standardization Sector of ITU; ITU–T Recommendation Q775, Mar. 1993; Specifications of Signalling System No. 7; Signalling System No. 7—Guidelines for Using Transaction Capabilities; pp. 1–34.

International Telecommunication Union, ITU–T Telecommunication Standardization Sector of ITU; ITU–T Recommendation Q711, Jul. 1996; Series Q: Switching and Signalling, Specifications of Signalling System No. 7—Signalling Connection Control Part; Functional Description of the Signalling Connection Control Part; pp. 1–32.

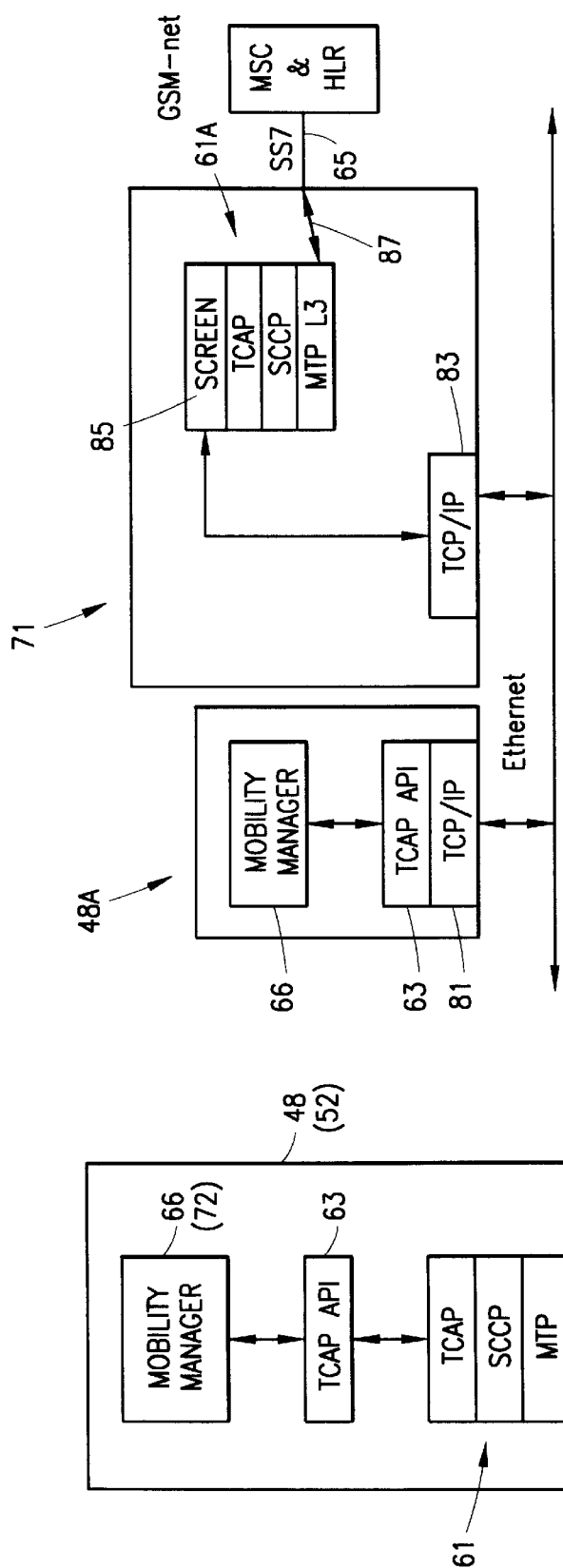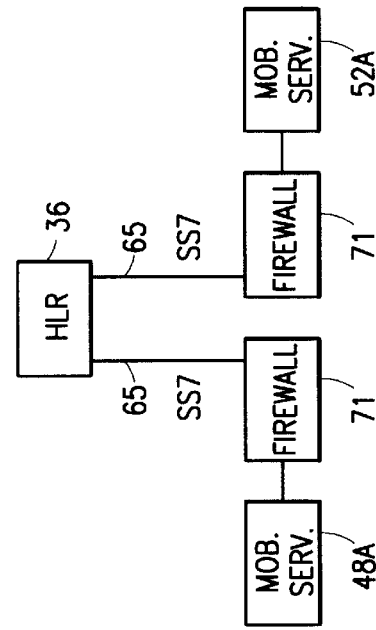

SCREENING MANAGEMENT PARAMETER VALUE

List of Valid IMSI-numbers

```
123456789
223456789
334567000-334567999
```

New Single Number:

New Range:
From    To

[ADD]  [DELETE]

[quit]

*FIG. 16*

SCREENING MANAGEMENT PARAMETER VALUE

List of Valid Roaming numbers

```
1234567
2234567
3234570
  ↓
3234590
```

New Single Number:

[ADD]  [DELETE]

[quit]

SIGNALING CHANNEL FIREWALL FOR COMMUNICATIONS BETWEEN WIRELESS NETWORKS

CROSS-REFERENCE TO RELATED APPLICATION

The subject matter of the present application is related to subject matter disclosed in U.S. Ser. No. 08/680,225 filed on Jul. 11, 1996.

FIELD OF THE INVENTION

The invention relates to signaling in wireless communications and, more particularly, to signaling between separate wireless communication networks.

BACKGROUND OF THE INVENTION

Advancements in the fields of electronics and communications have permitted the introduction and commercialization of many new types of communication systems. Information can be affordably communicated to locations and in manners previously not possible or affordable.

The field of cellular telephony is exemplary of a communication system that has been made possible due to such advancements. A fixed, wireline connection is not required between a transmitting station and a receiving station in a cellular, or other radiotelephonic, communication system to effectuate communications between the stations. Because a "wireless" connection is formed between the transmitting station and the receiving station, use of such a communication system is particularly advantageous to effectuate communications when a wireline connection cannot be conveniently or practically formed.

Various different types of cellular, and other radiotelephonic, communication systems have been implemented and others have been proposed. In many parts of the world, for instance, macrocellular communication networks have been installed. Such networks permit mobile subscriber units positioned anywhere within the area encompassed by the macrocellular networks to communicate pursuant to the macrocellular communication network. A macrocellular communication network typically includes a large number of base stations positioned at spaced-apart locations throughout a geographic area. As a mobile subscriber unit moves throughout the geographical area, communications with the mobile subscriber unit are "handed-off" to successive ones of the base stations. In one type of cellular communication system, a Global System for Mobile (GSM) communications system, control circuitry, including mobile services switching centers (MSCs) and base stations controllers (BSCs), controls communications between the base stations and the mobile subscriber unit. And, location registers, including a home location register (HLR) associated with the mobile subscriber unit, maintain a registry of the positioning of the mobile subscriber unit in a network.

Microcellular communication networks have also been developed and implemented. A Digital Electronic Cordless Telephone (DECT) system is exemplary of a microcellular communication network. A microcellular communication network, analogous to a macrocellular communication network, also permits wireless communications to be effectuated with a mobile subscriber unit. The area encompassed by a microcellular communication network is, however, typically much smaller than the area encompassed by a macrocellular communication network.

The costs associated with a microcellular communication network are generally less than the costs associated with a macrocellular communication network. However, because microcellular communication networks generally encompass limited areas, a single business, or other operator, might be required to construct more than one microcellular communication network to encompass a desired area in which microcellular communications are to be permitted.

For instance, a microcellular communication network might be constructed to provide microcellular communication coverage encompassing a single building. A mobile subscriber unit regularly registered to communicate pursuant to the microcellular communication network must be within the building, i.e., the area encompassed by the microcellular communication network, to communicate therethrough.

It is sometimes desirable to permit a mobile subscriber unit, regularly registered in one microcellular communication network (the "home" network), also to communicate in another microcellular communication network (the "visited" network). For instance, a business might have separate office locations, requiring separate microcellular networks to be installed for each of the separate office locations. It is sometimes desirable, in such instances, to permit personnel regularly located at one of the office locations to be able to communicate by way of a microcellular communication network even when the personnel are temporarily positioned at the other one of the office locations.

By providing communication links between the separate microcellular networks, registration, and other, information pertaining to the mobile subscriber unit stored at the "home" microcellular communication network can be used to permit communications with the mobile subscriber unit, even when the mobile subscriber unit is positioned in an area encompassed by the "visited" microcellular communication network.

Various proposals have been set forth to form communication links between microcellular networks by way of a macrocellular communication network. Such proposals, however, have generally been set forth for purposes of call control and not for purposes of mobility management. Viz. existing proposals for intercoupling the networks have not generally pertained to providing wide-area mobility to mobile subscriber units of microcellular communication networks.

Additionally, existing proposals generally require direct connections between the microcellular and macrocellular communication networks. As the operators of the macrocellular and microcellular communication networks might well be different entities, the conventional requirement for direct connections between the microcellular communication networks might sometimes be problematical.

A manner by which better to provide wide-area mobility to a mobile subscriber unit to increase the mobility permitted of the mobile subscriber unit would be advantageous.

Additionally, a manner by which to provide for the communication of mobility management information between a microcellular and macrocellular communication network without requiring direct connections therebetween would also be advantageous.

It is in light of this background information related to mobility management in a cellular communication system that the significant improvements of the present invention have evolved.

SUMMARY OF THE INVENTION

The present invention advantageously provides a method, and associated apparatus, for facilitating communications to and from a mobile subscriber unit operable in a microcellular communication network when the mobile subscriber unit roams into an area encompassed by a "visited" microcellular communication network other than the "home" network in which the mobile subscriber unit is regularly registered.

Wide-area mobility management functions available in a macrocellular network are provided to microcellular networks by coupling the microcellular networks to the macrocellular network. Wide-area mobility is thereby provided to a mobile subscriber unit operable in a microcellular communication network. The wide-area management functions provided to the microcellular communication network permits a mobile subscriber unit to communicate by way of a microcellular communication network even when it roams into an area encompassed by a "visited" network.

When the macrocellular communication network is formed of a Global System for Mobile communications (GSM) network, the microcellular communication networks include the mobility servers which appear, to the GSM network, to be mobile services switching centers (MSCs) of the GSM network. Mobility management normally provided to the mobile services switching centers of the GSM network are provided to the mobility servers of the microcellular networks. Signaling between the mobility server and the macrocellular communication network permits, for example, calls to be placed to and from a mobile subscriber unit when the subscriber unit roams beyond the microcellular communication network in which the subscriber unit is regularly registered. Location updating of the position at which the subscriber unit roams is similarly also effectuated.

In one aspect of the present invention, location information related to the position of a mobile subscriber unit is updated when the mobile subscriber unit roams into an area encompassed by a microcellular communication network other than the network in which the subscriber unit is regularly registered. A mobility server of such "visited" microcellular network receives indications of the positioning of the subscriber unit and provides information indicative thereof to a home location register (HLR) of the macrocellular communication network. The home location register (HLR) provides the visited mobility server with subscriber data related to the mobile subscriber unit and orders the "home" mobility server of the subscriber unit's home network to deregister the subscriber unit therefrom.

In another aspect of the present invention, calls originated at a Public Switched Telephone Network (PSTN) to be terminated to a mobile subscriber unit of the "home" microcellular communication network are routed to the subscriber unit when the subscriber unit roams beyond the "home" network and into a "visited" network. In one exemplary routing method, the call is routed via the home microcellular communication network to a gateway mobile services switching center (GMSC) of the macrocellular communication network, and the GMSC interrogates the home location register of the macrocellular network to obtain routing information to route the call to the roaming subscriber unit. The HLR requests and receives information from the mobility server of the "roaming" microcellular network. Such information is provided to the GMSC, and the call is routed to the mobile subscriber unit, to be terminated thereat.

In another aspect of the present invention, a call originated at a roaming, subscriber unit is routed to a subscriber unit registered in the macrocellular communication network. And, in yet another aspect of the present invention, calls are placed between a mobile subscriber unit positioned in a "home" microcellular network to a mobile subscriber unit roaming in a "visited" microcellular communication network. And, in yet another aspect of the present invention, the mobile subscriber unit forms a dual-mode subscriber unit, operable in both a microcellular network and a macrocellular network. Calls are placed, or received, by the subscriber unit when the subscriber unit is positioned in its "home" microcellular network, a visited microcellular network, or within an area encompassed only by the macrocellular network.

With respect to foregoing aspects of the present invention, the mobility management signaling entering the macrocellular network is screened to protect the functions of the macrocellular network from damage.

In these and other aspects, therefore, mobility-enhancing apparatus for a first mobility server facilitates communication with a mobile subscriber unit. The mobile subscriber unit is operable in a first microcellular communication network of a communication system having a macrocellular communication network and at least the first microcellular communication network. The first microcellular communication network includes the first mobility server. The mobility-enhancing apparatus facilitates communication with the mobile subscriber unit, operable in the first microcellular communication network, in a communication network other than the first microcellular communication network. A storage device stores location information representative of positioning of the mobile subscriber unit. A mobility manager is coupled to the storage device and to the macrocellular network. The mobility manager at least updates the location information stored in the storage device to indicate whether the mobile subscriber unit is positioned within range of the first microcellular communication network. The mobility manager further receives macrocellular network-generated data related to the mobile subscriber unit, and the network-generated data is used for the updating of the location information.

BRIEF DESCRIPTION OF THE DRAWINGS

FIG. 6 illustrates in detail an example of a mobility signaling portion of the mobility servers of FIGS. 1–5.

FIG. 7 is a block diagram illustrating an exemplary signaling channel firewall arrangement according to the present invention.

FIG. 8 illustrates the signaling channel firewall arrangement of FIG. 7 in greater detail.

FIGS. 16–19 illustrates specific values and ranges which can be defined in an exemplary parameter database according to the invention.

FIG. 20 illustrates an exemplary database for screening origination addresses according to the invention.

FIG. 21 illustrates an exemplary database for screening destination addresses according to the invention.

DETAILED DESCRIPTION

Figure 1:
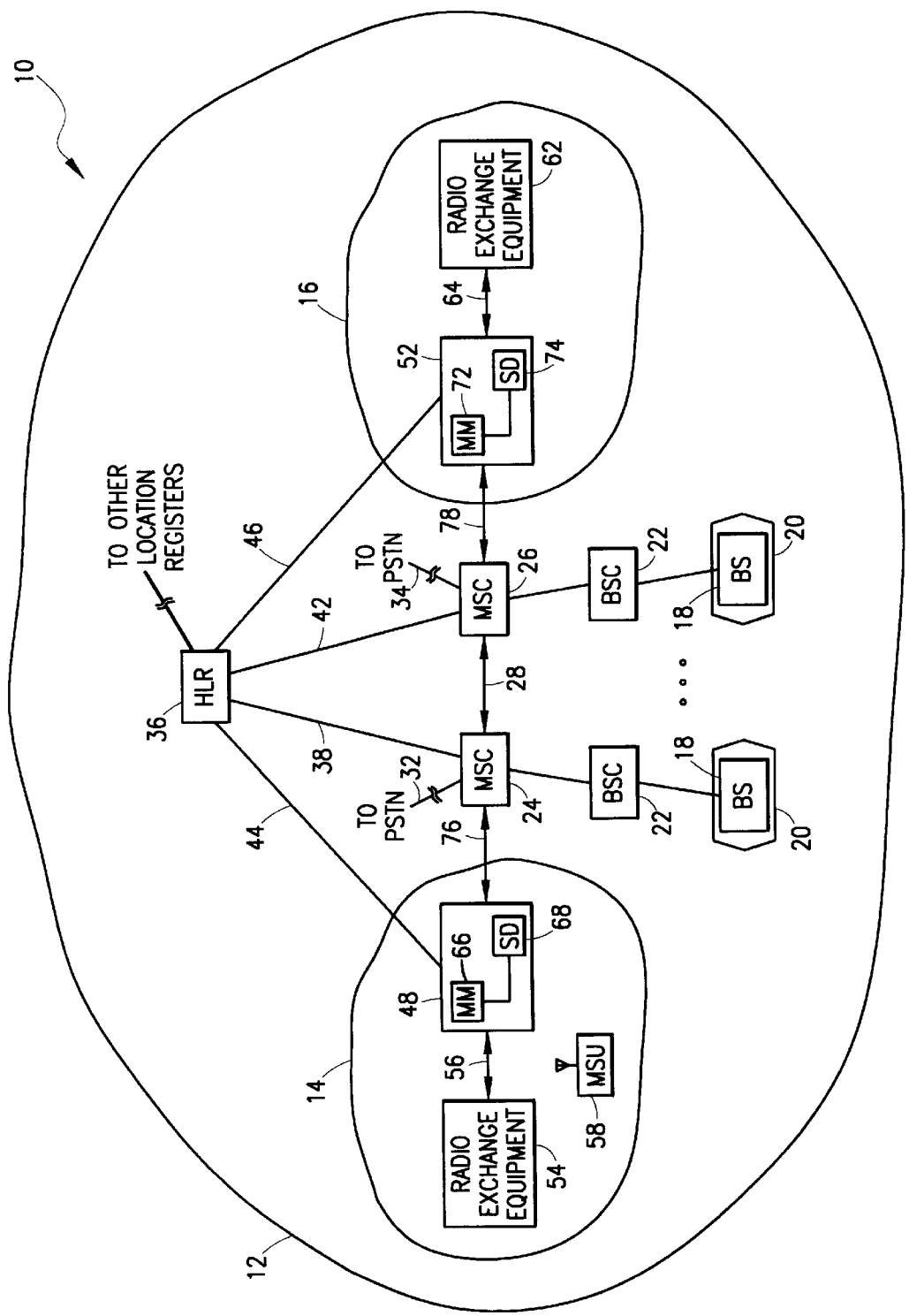
FIG. 1 illustrates a functional block diagram of a communication system which includes an embodiment of the present invention as a portion thereof.

Referring first to FIG. 1, a communication system, shown generally at 10, includes an embodiment of the present invention as a portion thereof. The communication system 10 is a multi-network communication system, here shown to include a macrocellular communication network 12, a first microcellular communication network 14, and a second microcellular communication network 16.

The microcellular communication network 12, for purposes of illustration, in the exemplary embodiment, is formed of a Global Systems for Mobile communications (GSM) network. In other embodiments, the macrocellular communication network 12 is alternatively formed of another type of Public Land Mobile Network (PLMN). Analogously, the first and second microcellular communication networks 14 and 16, respectively, are, in the exemplary embodiment, formed of Digital Electronic Cordless Telephone (DECT) systems. The microcellular networks 14 and 16 shall, at times, be referred to as DECT systems. In another embodiment, the networks 14 and 16 are alternatively formed of other types of Private Telephonic Networks (PTNs).

The macrocellular communication network 12 encompasses a macrocellular-region throughout which wireless communications by way of the network 12 are permitted. In conventional manner, the network 12 includes a plurality of spaced-apart base stations, of which two base stations 18 are illustrated in the figure. Each base station 18 encompasses an area defining a cell 20. The cells 20 defined by the base stations 18 collectively form the region encompassed by the network 12.

The base stations are coupled by way of base station controllers 22 to mobile services switching centers (MSCs), such as the mobile services switching centers 24 and 26. The base station controllers 22 are operable, inter alia, to control operation of the base stations 18 coupled thereto. Control operations, such as hand-off decisions and channel allocations, are performed at the controllers 22. Operation of the base station controllers 22, and the mobile services switching centers 24 and 26 of the exemplary embodiment corresponds generally with operation of such devices in existing standards specifications.

The mobile services switching centers 24 and 26 shown in the figure are inter-coupled, here indicated by the lines 28. The MSCs 24 and 26 are further coupled to a Public Switched Telephone Network (PSTN). Such couplings are illustrated by lines 32 and 34, respectively, in the figure.

The GSM network 12 further includes location registers including the home location register (HLR) 36. The HLR 36 is coupled to the MSCs 24 and 26 by way of lines 38 and 42, respectively. The HLR 36 is operable in the GSM communication network 12, inter alia, to perform wide-area mobility management functions to facilitate call routing to and from mobile subscriber units operable to communicate by way of the communication network 12. Such mobility management functions include, for instance, the maintenance of a subscriber registry. The subscriber registry contains information relating to the subscriber units' whereabouts and status.

The HLR 36 is further coupled, by way of lines 44 and 46, respectively, to mobility servers 48 and 52 of the DECT systems 14 and 16, respectively. In an exemplary embodiment, the mobility servers 48 and 52 are based on MD 110 hardware components. Services supported therefrom are developed on an Erlang platform. Services performed by the mobility servers 48 and 52 include those which are conventionally provided by mobility servers of conventional DECT systems.

The mobility server 48 is coupled to radio exchange equipment 54 by way of lines 56. The radio exchange equipment 54 includes transceiver circuitry permitting communication with mobile subscriber units, such as the mobile subscriber unit 58. Similarly, the mobility server 52 is coupled to radio exchange equipment 62 by way of lines 64. Analogous to the radio exchange equipment 54, the radio exchange equipment 62 includes transceiver circuitry permitting wireless communications with mobile subscriber units positioned within the area encompassed by the DECT system 16.

In one embodiment, the mobile subscriber unit 58 forms a dual-mode subscriber unit, selectively operable to communicate with both the GSM network 12 and the microcellular networks 14 and 16.

The mobility server 48 includes a mobility manager 66 capable of communicating information with the HLR 36. The mobility manager 66 is further coupled to a storage device 68 which also forms a portion of the mobility server 48. Similarly, the mobility server 52 includes a mobility manager 72 which is capable of communicating information with the HLR 36. The mobility manager is further coupled to a storage device 74 which also forms a portion of the mobility server 52. The mobility server 48 is further coupled to the MSC 24, here indicated by lines 76. And, the mobility server 52 is further coupled to the MSC 26, here indicated by the lines 78. Both the mobility servers 48 and 52 are further coupled to a PSTN and provide conventional call routing of calls between the PSTN and mobile subscriber units which are regularly registered in the respective communication networks 14 and 16.

The storage devices 68 and 74 store location information related to subscriber units operable in the respective networks associated with the mobility servers 48 and 52, respectively. As shall be described below, such location information can be updated during operation of an embodiment of the present invention. In one embodiment, the storage devices 68 and 74 further store service subscription information related to service subscriptions to which the subscriber units are subscribed.

During operation of an embodiment of the present invention, the wide-area mobility management functions provided by the GSM network 12 are further utilized by the DECT systems forming the microcellular networks 14 and 16. Such utilization provides wide-area mobility to mobile subscriber units operable in the networks 14 and 16. Thereby, communications with mobile subscriber units of the networks 14 and 16 are permitted when such subscriber units roam beyond the areas encompassed by the networks in which the subscriber units are regularly registered, viz., the subscriber units' "home" network. For instance, when the mobile subscriber unit 58 roams beyond the microcellular network 14 and into, for instance, the microcellular network 16, the wide-area mobility management functions provided by the GSM network 12 are utilized to facilitate communications with the "roaming" mobile subscriber unit. In an embodiment having dual-mode subscriber units, the wide-area mobility management functions provided by the GSM network are utilized by the subscriber units when communicating by way of the networks 14 and 16 and also when communicating by way of the GSM network 16.

Mobile application part (MAP) interfaces are introduced into the mobility servers 48 and 52, respectively. The MAP is specified in European Telecommunication Standard (ETS) 300 599, GSM 09.02 version 4.11.1, November 1995, which is hereby incorporated herein by reference. An analogous standard is the mobility management portion of TIA/EIA/IS-41, promulgated by the Telecommunication Industry Association (TIA) and the Electronics Industry Association (EIA). In one embodiment, five conventional MAP operations are supported by the MAP interface. Namely, update location (which is termed "registration notification" in IS-41), insert subscriber data, delete subscriber data, cancel location, and provide roaming number (termed "routing request" in IS-41) operations are supported by the MAP interface. Such operations are performed, as necessary, to permit communications with the subscriber unit when the subscriber unit roams beyond its home network.

Subscription information associated with mobile subscriber units, such as the subscriber unit 58, operable in the DECT network 14 are stored not only in the mobility server 48 but also in the HLR 36. Services pursuant to the subscription in the HLR 36, however, need not be defined. But, the subscriber unit 58 includes an MSISDN number and an IMSI number allocated thereto. The subscription for the subscriber unit in the HLR 36 is based on such numbers.

The mobility server 48 contains tables permitting transformation between a DECT identity, used to identify the subscriber unit in the DECT system 14 and the MSISDN and IMSI numbers, used to identify the subscriber unit in the GSM network 12.

The DECT identity, the IMSI, and the MSISDN allocated to the subscriber unit 58 are further defined in each mobility server, such as the mobility server 52, in each DECT system 16, or other PTN, in which the subscriber unit 58 is permitted to roam. Such information is predefined in the mobility servers. Such predefined information further includes a predefined service profile which, in one embodiment, is not otherwise transferred from the subscriber units' 58 home mobility server, here server 48, to a visited mobility server, here server 52. Each mobility server further includes a series of roaming numbers which are defined in manners similar to the roaming numbers defined in a mobile services switching center or location register of a conventional GSM network. Signaling between the MSCs 24 and 26 and the HLR 36 is routed by using a global title (GT) and subsystem number (SSN). Thereby, the mobility servers 48 and 52 appear to the HLR 36 as mobile services switching centers, similar to the switching centers 24 and 26. The mobility servers further include unique MSC/VLR addresses, similar to the MSC/VLR addresses which identify the MSCs of the macrocellular network 12.

Figure 2:
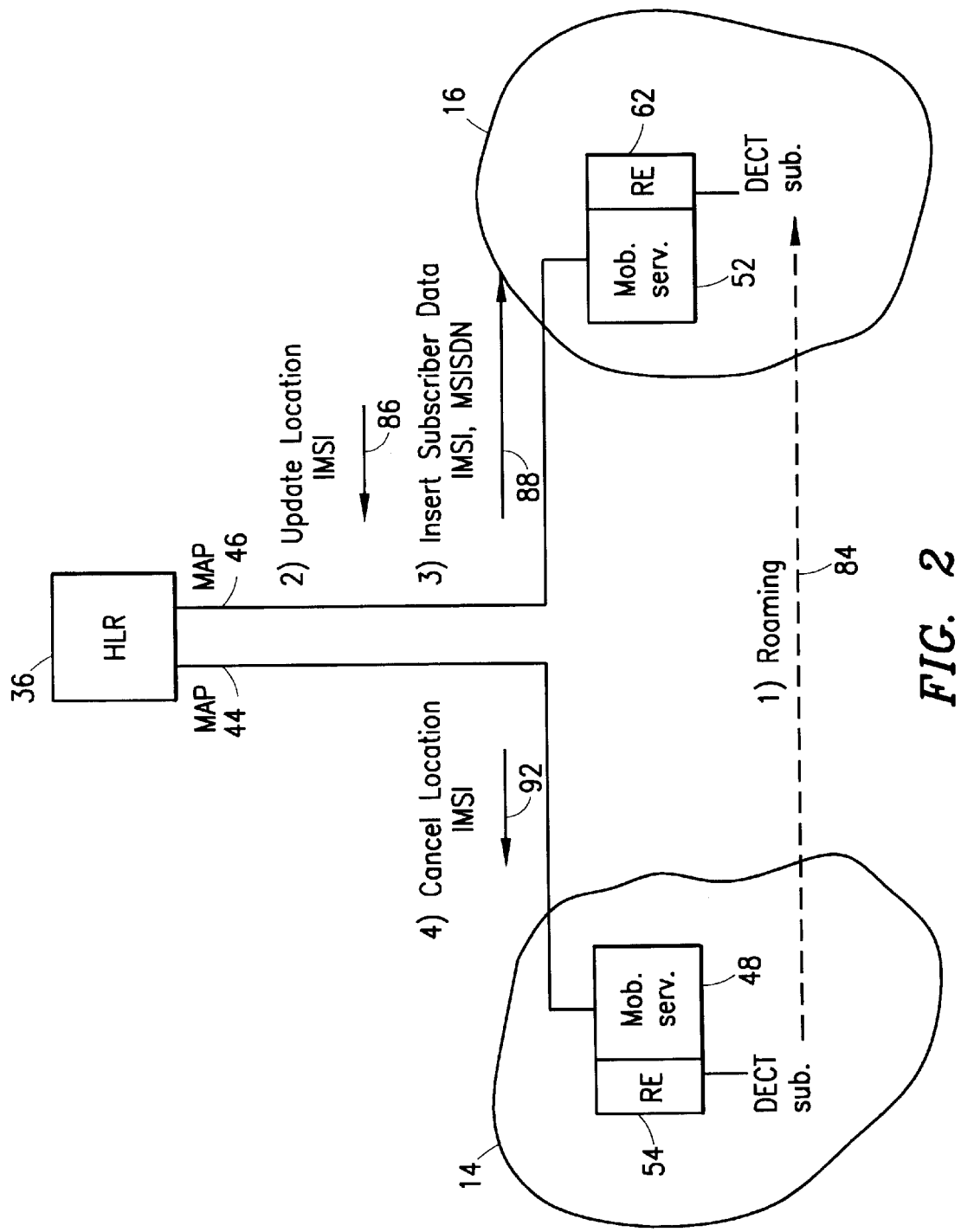
FIG. 2 illustrates a functional block diagram of a portion of the communication system shown in FIG. 1 used during operation of an embodiment of the present invention to update the location of a mobile subscriber unit when the mobile subscriber unit roams into an area encompassed by a microcellular communication network other than the "home" microcellular network in which the subscriber unit is regularly registered.

FIG. 2 illustrates again the HLR 36 of the GSM network 12 and the mobility servers 48 and 52 of the DECT systems 14 and 16, respectively. Lines 44 and 46 are again shown to couple the HLR 36 with the mobility servers 48 and 52, respectively. And, the radio exchange equipment 54 and 62 are again shown to be coupled to the respective mobility servers 48 and 52. When a mobile subscriber unit, here subscriber unit 58, roams out of the microcellular network 14, its home network, and into the microcellular network 16, the subscriber unit 58 registers with the mobility server 52. The roaming of the subscriber unit is indicated in the figure by the arrow 84. The identity of the subscriber unit 58 is indexed against a list of subscriber units permitted to roam. A subscriber unit 58 is assumed to be listed on such list and a transformation between the DECT identity of the subscriber unit 58 and its corresponding IMSI number is performed by the mobility manager 72.

Second, as indicated by the arrow 86, the mobility server 52 updates the location information of the subscriber unit with the HLR 36. Then, and as indicated by the arrow 88, the HLR 36 provides the mobility server 52 with subscriber data, namely the IMSI and MSISDN numbers, stored in the HLR 36. And, as indicated by the arrow 92, the HLR 36 causes the mobility server 48 to deregister the old registration of the subscriber unit 58 in the network 14. Thereby, the location of the subscriber unit 58 is updated to indicate its location in the area encompassed by the microcellular network 16, not the microcellular network 14.

Figure 3:
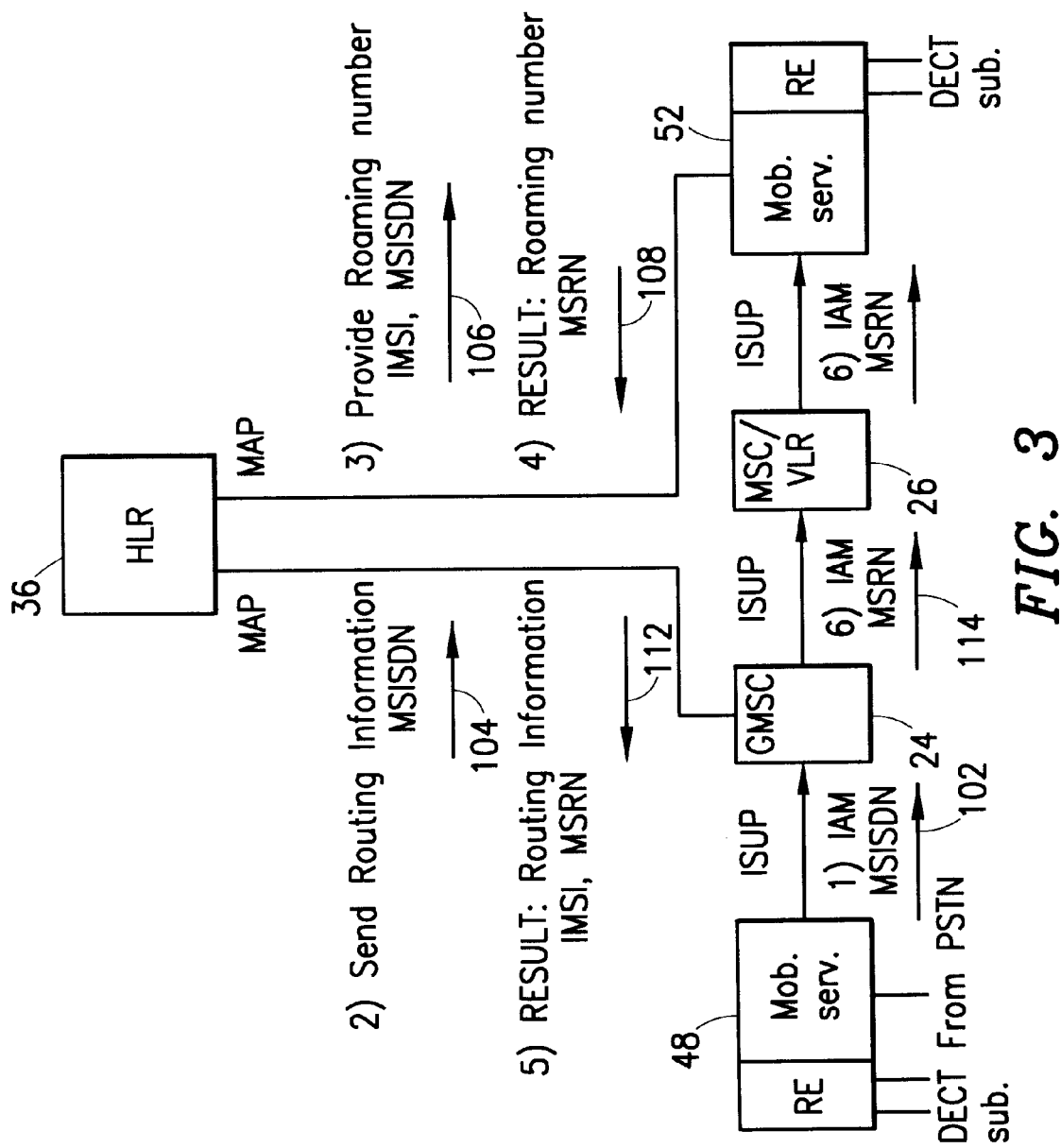
FIG. 3 illustrates a functional block diagram of a portion of the communication system shown in FIG. 1 used during a call to a mobile subscriber unit that has roamed into a microcellular communication network other than the "home" network in which the subscriber unit is regularly registered.

FIG. 3 illustrates operation of an embodiment of the present invention by which a call is routed to the subscriber unit 58, regularly registered at the network 14, when the subscriber unit 58 roams into the network 16. Elements of the communication system 10 utilized in the exemplary operation of call routing to the roaming, subscriber unit 58 are shown in FIG. 3 and identified by the same reference numerals used to identify such elements in FIG. 1.

When the mobility server 48 receives a call, such as a call originated at the PSTN to be terminated at the mobile subscriber unit, the identity of the subscriber unit is indexed against a list of subscriber units permitted to roam. The subscriber unit 58 is assumed to be on the list and marked as being roaming beyond the network 14. The mobility manager of the mobility server 48 translates the DECT identity of the subscriber unit into an MSISDN number, and the call is routed to the MSC 24, here forming a gateway MSC (GMSC). Such routing is indicated in the FIGURE by the arrow 102. Then, and as indicated by the arrow 104, the MSC 24 interrogates the HLR 36 for routing information to route the call to the roaming, subscriber unit.

Responsive to the interrogation, the HLR 36 requests a roaming number, MSRN, from the mobility server 52, as indicated by the arrow 106. The mobility server 52 returns the roaming number allocated to the subscriber unit 58 to the HLR 36, as indicated by the arrow 108. The HLR 36 thereafter, and as indicated by the arrow 112, returns the roaming number allocated to the subscriber unit 58 to the MSC 24. Once the roaming number is received at the MSC 24, the call is routed to the roaming subscriber unit 58, as indicated by the arrows 114, by utilizing the roaming number. The MSC 24, in one embodiment, generates both a transit call data record and a roaming call forwarding record, for billing purposes, if desired.

Figure 4:
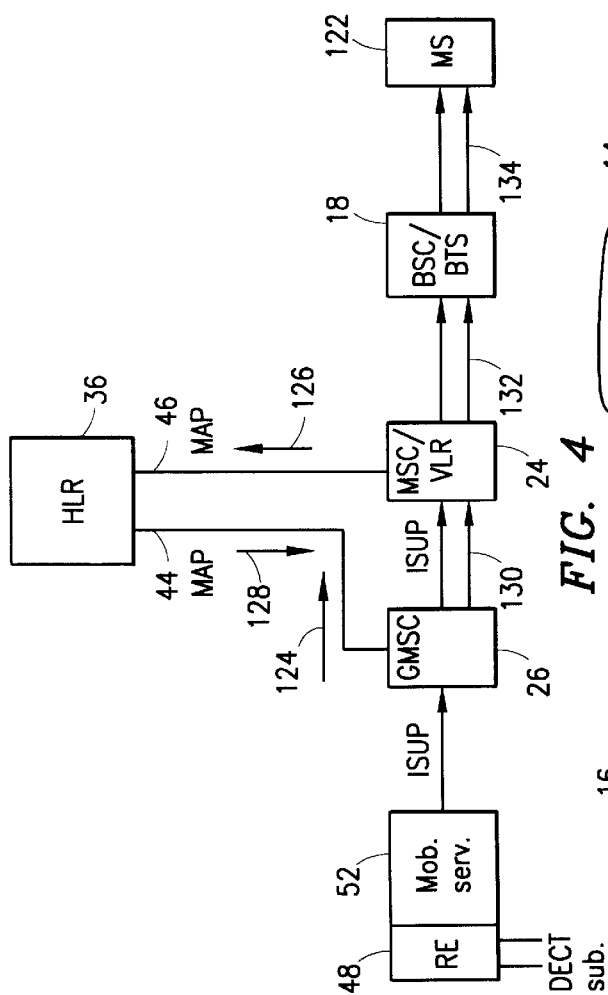
FIG. 4 illustrates a portion of the communication system shown in FIG. 1, used during operation of an embodiment of the present invention to route a call originated by a mobile subscriber unit when the mobile subscriber unit is positioned in an area encompassed by a microcellular communication network other than the "home" network in which the subscriber unit is regularly registered.

FIG. 4 illustrates operation of an embodiment of the present invention by which the wide-area management functions provided by the GSM network 12 of the communication system 10 are utilized to facilitate routing of a call originated at a roaming subscriber unit, here subscriber unit 52 to a mobile subscriber unit operable in the GSM network. Again, elements of the communication system 10 utilized during such operation are identified with the same reference numerals utilized to identify such elements in FIG. 1.

The subscriber unit 58 originates a call, indications of which are received by the radio exchange equipment 62. The call request is provided to the mobility server 52 and the mobility manager 72 thereof indexes the identity of the roaming, subscriber unit against a listing of subscriber units permitted to roam. The subscriber unit is assumed to be on the list and the predefined service profile associated therewith is used for the subscriber unit 58.

The call is set up by way of the MSC 26, here forming a gateway MSC (GMSC) and the DECT identity of the subscriber unit 58 is used as an A-number. The call is thereafter routed, in conventional fashion pursuant to the GSM network, to be terminated at the mobile subscriber, here a mobile subscriber 122. That is to say, the MSC 26 interrogates the HLR, as indicated by the arrow 124, for routing information. Such routing information is received at the HLR 36 from the MSC 24, as indicated by the arrow 126, and a visited location register (not shown) associated therewith. The routing information is provided to the MSC 26, as indicated by the arrow 128. Responsive to the routing information, the call is routed from the MSC 26, to the MSC 24, as indicated by the arrow 130, and thereafter to the appropriate base station 18, as indicated by the arrow 132. The call is the thereafter terminated at the mobile station 122, as indicated by the arrow 134.

Figure 5:
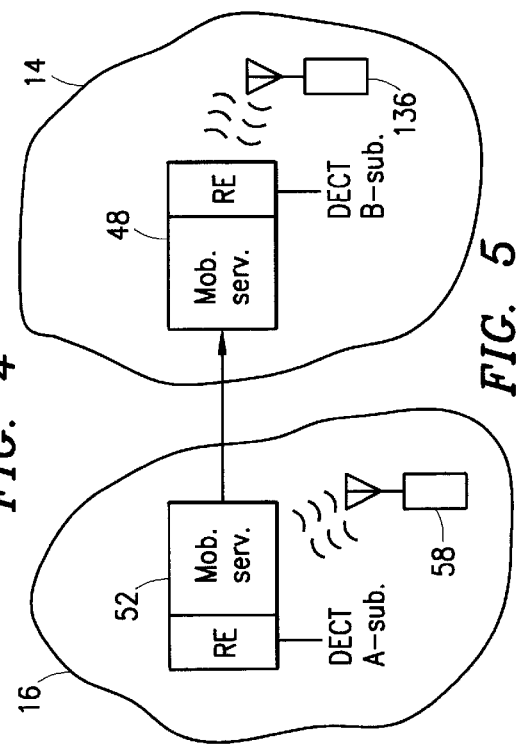
FIG. 5 illustrates a portion of the communication system shown in FIG. 1 used during operation of an embodiment of the present invention to route a call between subscriber units positioned in different microcellular communication networks.

FIG. 5 illustrates operation of an embodiment of the present invention which permits routing of a call originated by a roaming, subscriber unit, here subscriber unit 58, to another subscriber unit, here subscriber unit 136, positioned in another DECT network, here DECT network 14. The roaming, subscriber unit 58 generates a call to the subscriber unit 136. The identity of the subscriber unit 58 is indexed against a list of permitted roaming subscriber units. The subscriber unit 58 is assumed to be listed on the list, and a predefined profile is allocated to the subscriber unit. The identity of the subscriber unit 136 is also indexed against a list of permitted roaming, subscriber units. Here, the subscriber unit 136 is assumed not to be listed upon the list of subscriber units permitted to roam. The call is thereby routed as an ordinary call between two DECT networks.

Operation of the present invention permits wide-area mobility management functions provided by a macrocellular communication network to be utilized by a microcellular communication network to facilitate communication with a mobile subscriber. A mobile subscriber regularly registered in one microcellular communication network can roam to another microcellular communication network and utilize the wide-area mobility permitted in a macrocellular communication network to route calls to the roaming, subscriber unit.

FIG. 6 is an example implementation of the mobility management part of the mobility servers 48 and 52 of FIGS. 1–5. The mobility manager 66 (72) can be, for example, a software application executing on the mobility server 48 (52). The server 48 (52) communicates with the HLR 36 via a conventional SS7 signaling channel 65 which passes through the associated MSC (not shown in FIG. 6). The mobility manager accesses the SS7 signaling channel via a conventional communications protocol stack at 61. This protocol stack includes the Transaction Capabilities Application Part (TCAP) layer pursuant to ITU-T (International Telecommunication Union-Telecommunication Standardization Sector) Recommendations Q.771, Q.772, Q.773, Q.774 and Q.775 which are hereby incorporated herein by reference. The protocol stack 61 further includes the Signaling Connection Control Part (SCCP) according to ITU-T Recommendation Q.711, which is hereby incorporated herein by reference. The protocol stack 61 further includes the Message Transfer Part (MTP) according to ITU-T Recommendation Q.701, which is hereby incorporated herein by reference.

A TCAP API 63 interfaces between the mobility manager 66 (72) and the TCAP layer of protocol stack 61. The use of an API, or Application Programming Interface, to interface between a software application and the TCAP layer is well known in the art. The TCAP API is conventionally used for embedding MAP operations in TCAP messages and, conversely, for removing embedded MAP operations from TCAP messages.

The TCAP layer itself is a well known conventional provider of an interface between applications and a network layer service, and the SCCP and MTP protocol layers are well known examples of network layer service providers. The SCCP and MTP protocol layers conventionally provide an interface between the TCAP layer and the conventional SS7 (Signaling System Number 7) signaling channel 65, as described in ITU-T Recommendation Q.700, which is hereby incorporated herein by reference. The protocol stack 61 translates communication signals input to the TCAP layer using TCAP protocol into corresponding signals for transmission over the SS7 signaling channel 65. The use of the SS7 signaling channel to support MAP signaling to the HLR is well known in the art.

One problem with the arrangements illustrated in FIGS. 1–6 wherein a microcellular network uses SS7 signaling to access mobility management features of a macrocellular network is that the externally applied signaling from the microcellular network can disadvantageously interfere with existing functions of the macrocellular network that are supported by SS7 signaling within the macrocellular network.

Accordingly, and referencing example FIG. 7, the present invention provides a firewall 71 between the mobility server 48A and the associated SS7 signaling channel to HLR 36, and similarly provides a firewall 71 between the mobility server 52A and the associated SS7 signaling channel to HLR 36. The firewall 71 provides a protective isolation between the mobility servers 48A, 52A and their respective SS7 signaling channels to HLR 36, so it is possible to avoid the aforementioned interference with existing functions.

FIG. 8 illustrates a more detailed example of the arrangement of FIG. 7. The mobility servers of FIGS. 7 and 8 are designated as 48A and 52A to reflect the difference between those mobility servers and the mobility servers of FIGS. 1–6. The difference between the mobility server 48A (FIG. 8) and the mobility server 48 (FIG. 6) is best seen by comparing FIGS. 6 and 8. In particular, the TCAP API 63 of FIG. 6 interfaces with the SS7 signaling channel 65 via the protocol stack 61, whereas the TCAP API 63 of FIG. 8 interfaces with a conventional Ethernet system via a conventional TCP/IP application 81. The mobility server 48A (52A) of FIGS. 7 and 8 may otherwise be identical to the mobility server 48 (52) of FIGS. 1–6.

The TCP/IP application 81 communicates via Ethernet link with another conventional TCP/IP application 83 in the firewall 71. Applications 81 and 83 could be linked in any desired manner, such as by LAN (Local Area Network) or a private intranet. The TCP/IP application 83 provides a communications interface between the Ethernet system and a communications protocol stack 61A. The protocol stack 61A is similar to the above-described conventional protocol stack 61, in that it includes the conventional TCAP, SCCP and MTP protocol layers. However, the protocol stack 61A differs from the protocol stack 61 in that it includes a screening function at 85. The screening function 85 can be implemented as a software module between the TCP/IP application 83 and the conventional TCAP layer as shown in FIG. 8, or can be incorporated into the software of the TCAP layer. The SCCP and MTP layers interface the screened TCAP layer with the SS7 signaling channel 65 to MSC and HLR.

The screening function 85 operates to screen the various TCAP protocol communications received by firewall 71 from mobility server 48A. TCAP protocol communications or messages are transmitted from TCAP API 63 to protocol stack 61A via TCP/IP applications 81 and 83, as connected by the Ethernet link. Only TCAP communications which pass the screening function 85 are translated by protocol stack 61A into signals for the SS7 signaling channel 65. Disallowed communications which are caught in the screening function 85 are not translated and thus are never permitted to access the SS7 signaling channel.

The screening function 85 is transparent to communications passing from channel 65 toward the mobility server 48A.

Figure 13:
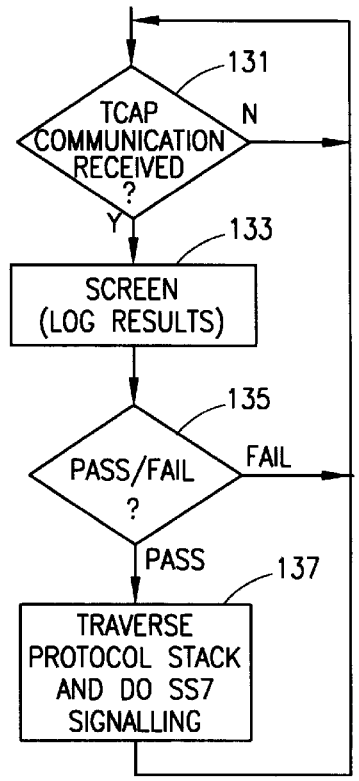
FIG. 13 illustrates generally the operation of the screening function of FIG. 8 with respect to the operation of the protocol stack and SS7 signaling channel of FIG. 8.

FIG. 13 illustrates one example of how the screening function 85 may be implemented either as a separate software module or as part of the TCAP protocol layer of protocol stack 61A. When a conventional TCAP protocol message containing, for example, a MAP operation, is received (131), the screening function 85 is implemented at 133. If desired, the results of the screening function can be logged into an appropriate database or databases in the protocol layer where the screening is done. For example, TCAP communications which pass the screening function can be stored in a "PASS" database, and TCAP communications which fail the screening function can be stored in a "FAIL" database. If the TCAP communication fails to pass the screening function, then control proceeds from 135 back to 131 to await the next TCAP communication. If the TCAP communication passes the screening function, then that communication is permitted to traverse the protocol stack through the TCAP layer, the SCCP layer and the MTP layer to the SS7 signaling channel 65. The communication is signaled into the macrocellular network on the SS7 signaling channel.

Figure 9:
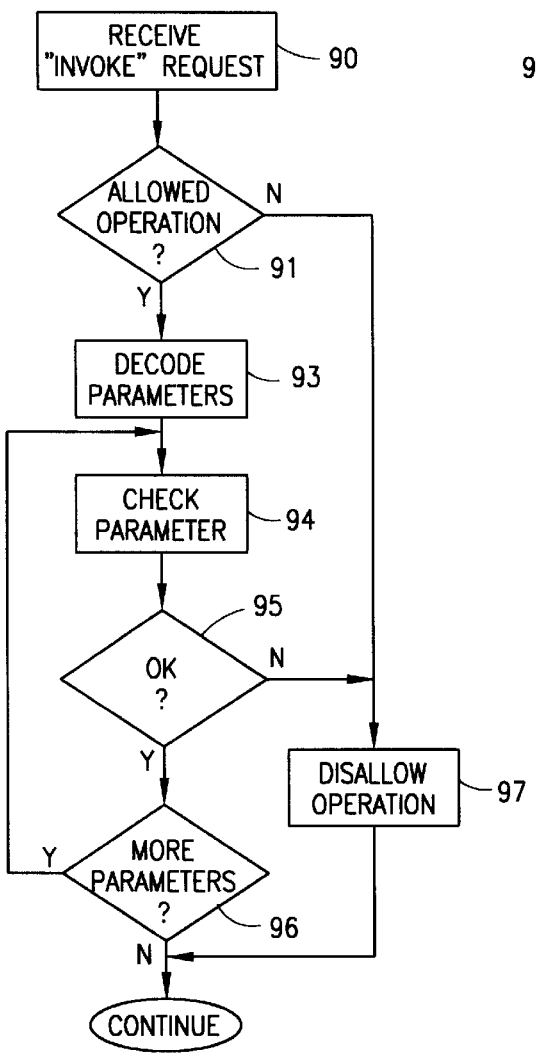
FIG. 9 illustrates the operation of one part of the screening function of FIG. 8.

FIG. 9 illustrates an exemplary portion of the screening procedure 133. In particular, FIG. 9 illustrates an example screening response when a conventional TCAP Invoke request pursuant to ITU-T Recommendations Q.771–Q.775 is received from TCP/IP application 83. When the Invoke request is received at 90, it is first determined at 91 whether or not the operation to be invoked, (for example, a MAP operation) is an allowed operation. If not, then the operation is disallowed at 97 and the TCAP communication is not translated (not allowed to pass through the protocol stack 61A) to the SS7 signaling channel 65. If the operation to be invoked is an allowed operation, then the parameters associated with the operation to be invoked are decoded at 93. The decoding will typically involve conventional decoding techniques according to Abstract Syntax Notation One (ASN.1).

After the parameters have been decoded at 93, a check parameter procedure is executed at 94. If the check parameter procedure 94 yields an OK result at 95, then it is determined at 96 whether more parameters are included in the Invoke request. If so, then the check parameter procedure at 94 is executed again for the next parameter. If there are no more parameters to be checked at 96, and if all results from procedure 94 are OK, then the operation to be invoked has passed the screening. The screening procedure 133 of FIG. 13 can thus continue to perform any other necessary screening operations, or permit the Invoke request to traverse the TCAP, SCCP and MTP layers to the SS7 signaling channel 65 in conventional fashion. If the check parameter procedure 94 yields any result that is not OK at 95, then the operation to be invoked is disallowed at 97.

Figure 10:
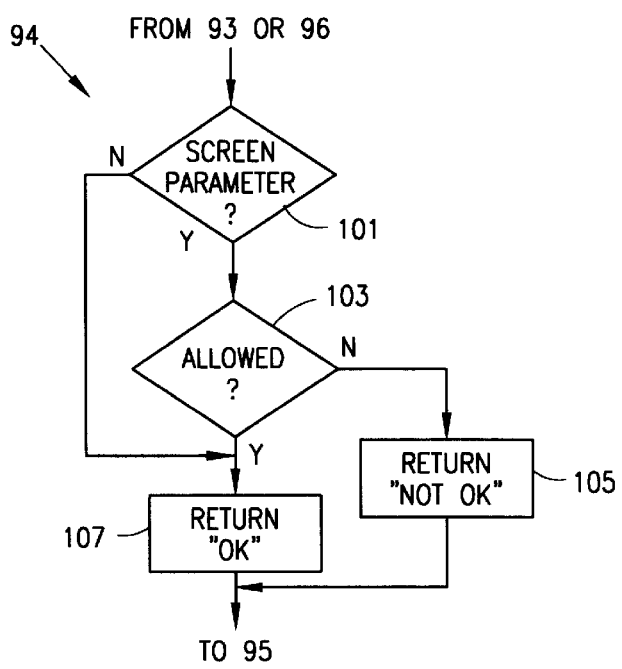
FIG. 10 illustrates a portion of FIG. 9 in greater detail.

FIG. 10 illustrates one example of the check parameter procedure 94 of FIG. 9. It is first determined at 101 whether or not the parameter is to be subjected to the screening process. If not, then an "OK" result is returned at 107. If the parameter is to be screened at 101, then it is determined at 103 whether or not the parameter is an allowed parameter. If so, the "OK" result is returned at 107. If the parameter is not an allowed parameter at 103, then a "not OK" result is returned at 105.

Figure 11:
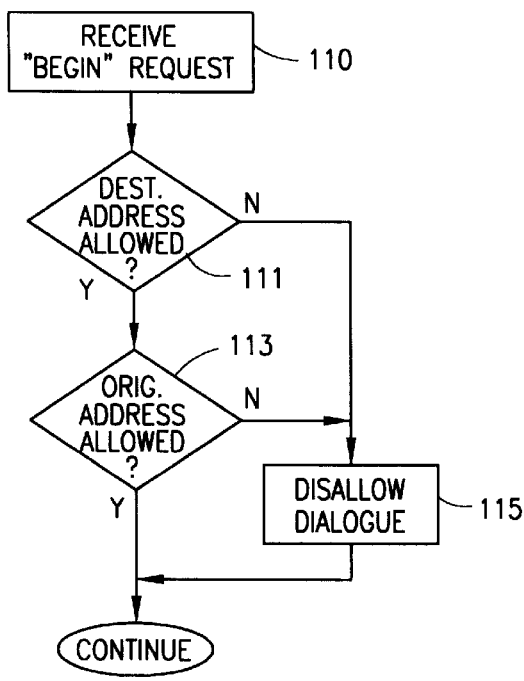
FIG. 11 illustrates the operation of another part of the screening function of FIG. 8.

FIG. 11 illustrates one example of a screening operation which can be performed when a conventional TCAP Begin request pursuant to ITU-T Recommendations Q.771–Q.775 (termed "TCAP Query with Permission" in IS-41) is received from the TCP/IP application 83. In particular, if a conventional TCAP Begin request is received at 110, it is first determined at 111 whether or not the destination address is an allowed destination address. If not, then the dialogue conventionally associated with the Begin request is disallowed at 115, and no communication is translated (allowed to traverse the TCAP, SCCP and MTP layers) to the SS7 signaling channel 65. If the destination address is an allowed destination address at 111, it is then determined at 113 whether or not the origination address is an allowed origination address. If the origination address is not an allowed origination address at 113, the dialogue is disallowed at 115. If the origination address is an allowed origination address at 113, then the screening procedure 131 can continue to perform other screening operations, or the Begin request can be permitted to traverse the TCAP, SCCP and MTP layers to the SS7 signaling channel in conventional fashion.

Figure 12:
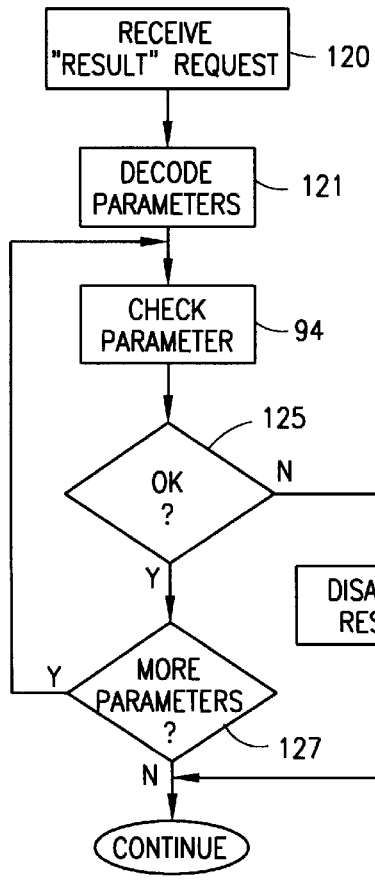
FIG. 12 illustrates the operation of another part of the screening function of FIG. 8.

FIG. 12 illustrates one example of a screening operation which can be performed when a conventional TCAP Result request pursuant to ITU-T Recommendations Q.771–Q.775 is received from the TCP/IP application 83. Such a Result request is sent, for example, when the mobility server 48A provides a roaming number in response to a request from HLR. When the Result request is received at 120, any parameters associated therewith (such as a roaming number) are first decoded at 121 in generally the same manner discussed above with respect to the decode parameters procedure at 93 in FIG. 9. After the parameters are decoded at 121, the check parameter procedure 94 of FIGS. 9 and 10 is performed. If the check parameters procedure returns a "not OK" result at 125, then the Result is disallowed at 123, and no communication is permitted to traverse the TCAP, SCCP and MTP layers to the SS7 signaling channel 65.

If the check parameter procedure returns an "OK" result at 125, then it is determined at 127 whether or not any parameters remain to be checked. If so, then the check parameter procedure at 94 is performed again with respect to the next parameter. When there are no more parameters to be checked at 127, the Result associated with the Result request can traverse the TCAP, SCCP and MTP layers to reach the SS7 signaling channel 65. If the check parameter procedure 94 returns a "not OK" result for any parameter, then the Result is disallowed at 123 and no communication is permitted to traverse the TCAP, SCCP and MTP layers to reach the SS7 signaling channel.

The firewall 71 of FIGS. 7–13 can be advantageously implemented in a suitable conventional workstation such as is commercially available from, for example, Sun Microsystems. The necessary hardware and software for implementing the conventional protocol stack 61 are commercially available from, for example, Ericsson Infotech, and the above-described screening procedures can be readily implemented either in the software of the TCAP layer of conventional protocol stack 61, or as a software module between TCP/IP application 83 and the TCAP layer. A conventional connection board for making the connection 87 between the MTP layer and the SS7 signaling channel 65 is also commercially available from ADAX.

Below are described various databases which can be maintained within the screening function of FIG. 8. The information in these databases is used in the screening operations discussed above relative to FIGS. 9–13, as will be clear from the following description.

Figure 14:
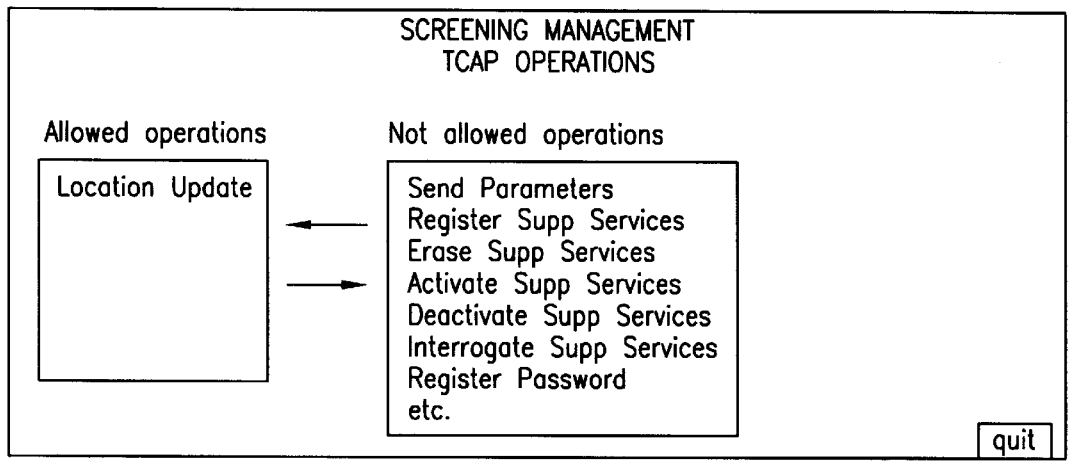
FIG. 14 illustrates an exemplary database of operations that can be screened according to the present invention.

FIG. 14 illustrates an example of a TCAP operations database including a listing of operations that TCAP is allowed to invoke, and a listing of operations that TCAP is not allowed to invoke. The database can, as shown in FIG. 14, be accessed and visually displayed by the firewall workstation, thereby permitting the macrocellular network operator freely to move various operations from the allowed operations list to the disallowed operations list. The operations shown in FIG. 14 correspond to conventional MAP operations. These operations may be included either in the allowed or disallowed operations list according to the desire of the macrocellular network operator.

Figure 15:
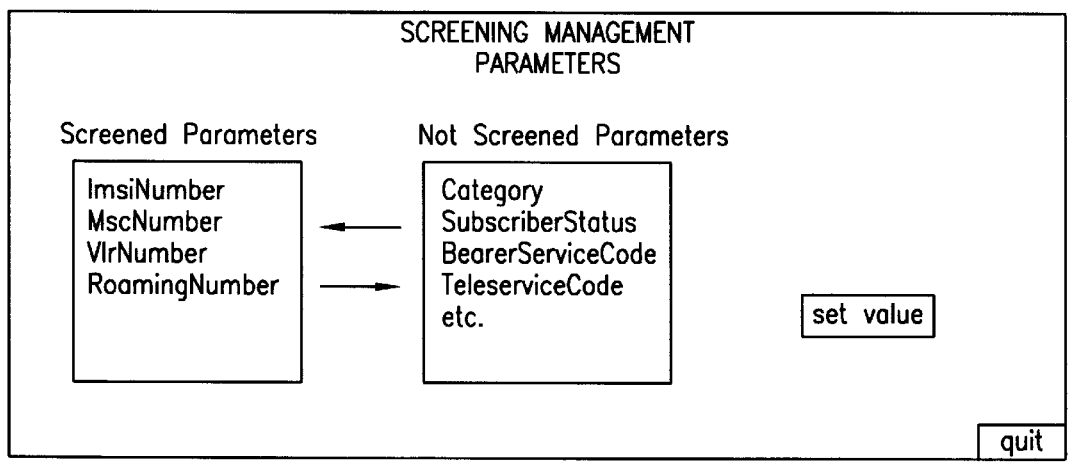
FIG. 15 illustrates an exemplary database of parameters that can be screened according to the present invention.

FIG. 15 shows one example of a parameters database including a list of parameters which will be screened and a list of parameters which will not be screened. As above, the operator has full freedom to change any parameter from the screened list to the not screened list.

FIG. 16 shows an example of a database including valid values for a given parameter such as the conventional IMSI (International Mobile Subscriber Identity) number. The database can be displayed as above, and the list of valid IMSI numbers can be specified as a plurality of individual numbers and/or as a range or ranges of numbers. The IMSI number is a parameter associated with the aforementioned "update location" operation.

FIG. 17 is similar to FIG. 16 but shows a parameter database of valid roaming number values.

Figure 18:
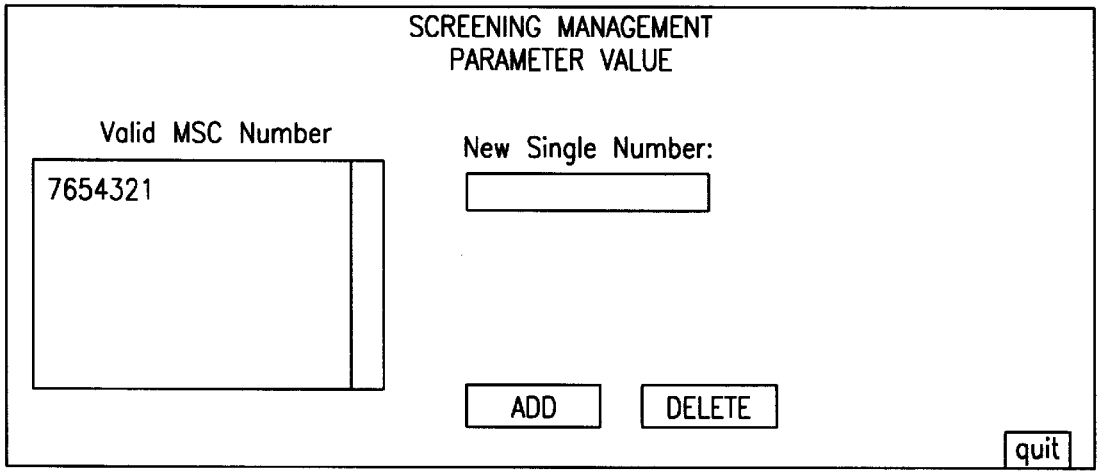

FIG. 18 illustrates one example of a database that specifies the valid MSC number. As can be seen from the foregoing description, each mobility server in effect acts as an MSC during mobility management operations. Thus, each mobility server has associated therewith an MSC number. Because a given firewall 71 typically communicates with only one mobility server, the database of FIG. 18 will typically have only a single entry, namely the MSC number of the mobility server associated with the firewall. The MSC number is a parameter of the aforementioned "update location" operation.

Figure 19:
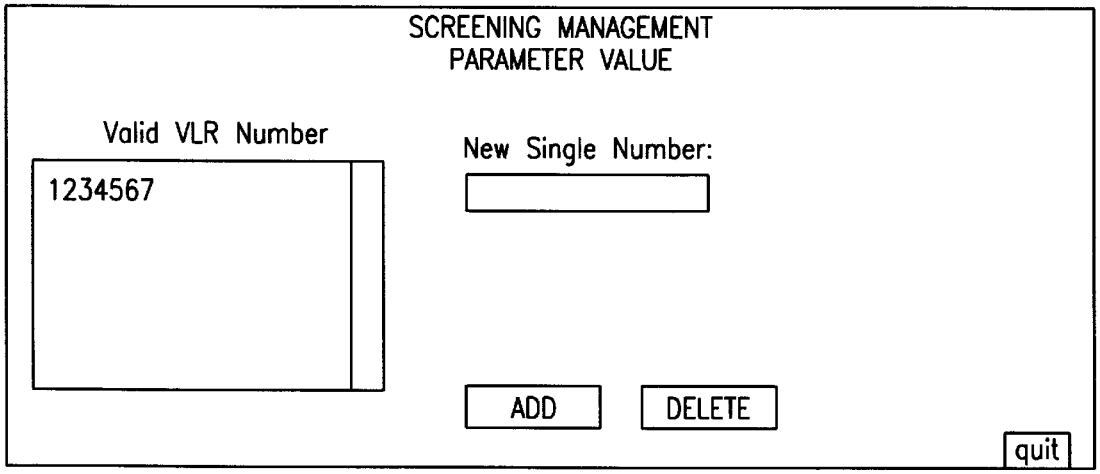

FIG. 19 is similar to FIG. 18, but illustrates a database for a valid VLR number. Because each mobility server acts as an MSC, it also has a VLR number. Again, a given firewall will typically have associated therewith only one mobility server (see FIG. 7), so the database of FIG. 19 will typically have only one entry. The VLR number is a parameter of the aforementioned "update location" operation.

Figures 20, 21:
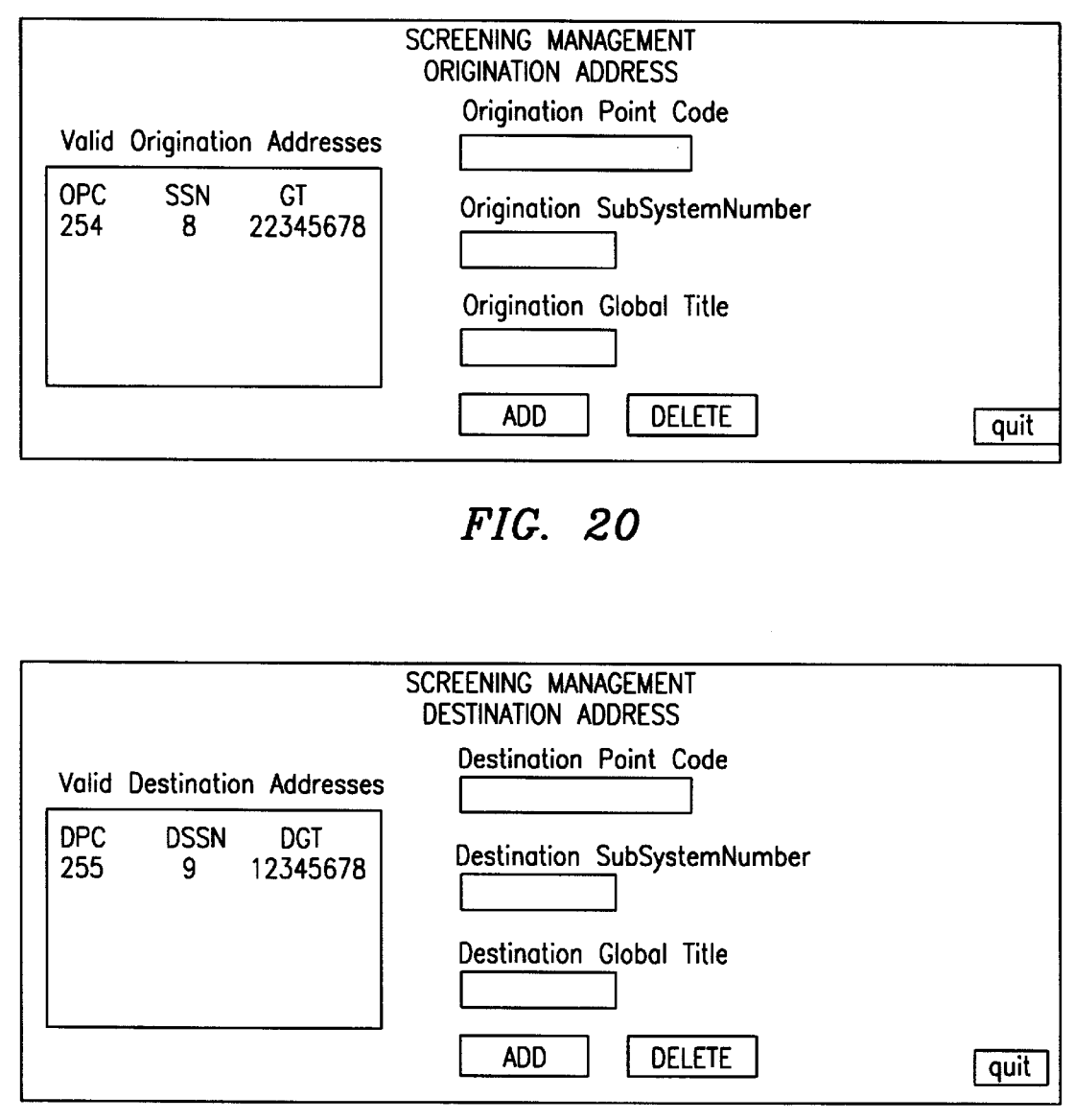

FIGS. 20 and 21 illustrate respectively the database for valid origination addresses and the database for valid destination addresses. The origination address of FIG. 20 includes an Origination Point Code OPC, an Origination SubSystemNumber SSN, and an Origination Global Title GT, and the destination address of FIG. 21 includes a Destination Point Code DPC, a Destination SubSystemNumber DSSN and a Destination Global Title DGT. For a given firewall 71, the only valid origination address will be the address of the associated mobility manager, and the only valid destination address will be the address of the HLR. Accordingly, the databases in FIGS. 20 and 21 will each typically need only a single entry.

All of the databases of FIGS. 15–21 can be easily accessed and modified in the same general manner as described above relative to FIG. 14.

The above-described databases of FIGS. 14–21, when utilized in conjunction with the above-described screening operations of FIGS. 9–13, permit the firewalls 71 of FIGS. 7–8 to screen communications (e.g. MAP communications) from the mobility managers for the protection of the SS7 signaling channel 65 in the macrocellular network. The firewall workstation can be provided as part of the macrocellular network, thereby permitting the operator of the macrocellular network to control incoming signaling on the SS7 signaling channel. Moreover, the firewall can be used to control incoming signaling other than the mobility management (e.g. MAP) signaling described above.

Although exemplary embodiments of the present invention have been described above in detail, this does not limit the scope of the invention, which can be practiced in a variety of embodiments.

What is claimed is:

1. An isolation structure for interfacing between a microcellular network and a signaling channel of a macrocellular network that is larger than the microcellular network, comprising:

an input that receives communication signals from the microcellular network;

an output that provides signaling on the signaling channel in response to the communication signals; and an apparatus, coupled between said input and said output, and implementing a communications protocol stack that translates some of said communication signals into said signaling on the signaling channel but selectively, and independently of conditions in the macrocellular network, denies translation of some of said communication signals into said signaling on the signaling channel, said communications protocol stack operable to translate further signaling received from the signaling channel into further communication signals for use in the microcellular network.

2. The isolation structure of claim 1, wherein said input includes a TCP/IP application.

3. The isolation structure of claim 2, wherein said input includes an Ethernet port coupled to said TCP/IP application.

4. The isolation structure of claim 1, wherein said signaling channel is an SS7 channel.

5. The isolation structure of claim 1, wherein said communications protocol stack includes a TCAP layer, an SCCP layer and an MTP layer.

6. The isolation structure of claim 1, wherein said communication signals and said signaling on the signaling channel relate to mobility management functions provided by the macrocellular network to a mobile terminal whose home registration is in the microcellular network.

7. The isolation structure of claim 1, wherein said protocol stack includes a list of IMSI numbers whose corresponding mobile terminals are registered in the microcellular network and are permitted access to mobility management services of the macrocellular network.

8. The isolation structure of claim 1, wherein said protocol stack includes a list of mobility management services that are provided by the macrocellular network and are permitted to be accessed by a mobile terminal having its home registration in the microcellular network.

9. The isolation structure of claim 8, wherein said protocol stack includes a plurality of lists of parameters that are respectively permitted in conjunction with said mobility management services.

10. The isolation structure of claim 1, wherein said protocol stack includes a list of origination addresses and destination addresses between which communication via the signaling channel is permitted.

11. The system of claim 1, wherein said communications protocol stack includes a screen module for selectively denying translation of said communication signals.

12. The system of claim 11, wherein said screen module is a dedicated layer of said communications protocol stack.

13. The system of claim 11, wherein said screen module is incorporated into a layer of said communications protocol stack which is also operable to perform a function included in said translation operation.

14. A method of interfacing between a microcellular communication network and a signaling channel of a macrocellular communication network that is larger than the microcellular network, comprising:

receiving communication signals from the microcellular network;

using a communications protocol stack to translate the communication signals into further signals, and transmitting the further signals over the signaling channel;

said using step including translating some of the communication signals into the further signals and, independently of conditions in the macrocellular network, using the communications protocol stack to selectively deny translation of some of the communication signals into the further signals;

receiving signals from the signaling channel; and using the communications protocol stack to translate the signals received from the signaling channel into communication signals for use in the microcellular network.

15. The method of claim 11, wherein said receiving step includes using a TCP/IP application to receive the communication signals.

16. The method of claim 15, wherein said receiving step includes using an Ethernet port to receive the communication signals.

17. The method of claim 14, wherein said communication signals and said further signals relate to mobility management functions provided by the macrocellular network to a mobile terminal whose home registration is in the microcellular network.

18. The method of claim 14, wherein said using step includes accessing a list of IMSI numbers whose corresponding mobile terminals are registered in the microcellular network and are permitted access to mobility management services of the macrocellular network.

19. The method of claim 14, wherein said using step includes accessing a list of mobility management services that are provided by the macrocellular network and are permitted to be accessed by a mobile terminal having its home registration in the microcellular network.

20. The method of claim 19, wherein said using step includes accessing a list of parameters that are permitted in conjunction with one of said mobility management services.

21. The method of claim 14, wherein said using step includes accessing a list, provided in the communications protocol stack, of origination addresses and destination addresses between which communication via the signaling channel is permitted.

22. The method of claim 14, wherein said translating step includes permitting information represented by the communication signals to traverse a plurality of layers in the communications protocol stack.

23. A communication system, comprising:

a microcellular communication network;

a macrocellular communication network that is larger than said microcellular network, said macrocellular network including a signaling channel; and an isolation interface coupled between said microcellular network and said signaling channel of said macrocellular network, said isolation interface including an input that receives communication signals from said microcellular network, an output that provides signaling on said signaling channel in response to said communications signals, and an apparatus coupled between said input and said output and implementing a communications protocol stack that translates some of said communication signals into said signaling on the signaling channel but selectively, and independently of conditions in the macrocellular network, denies translation of some of said communication signals into said signaling on the signaling channel, said communications protocol stack operable to translate further signaling received from the signaling channel into further communication signals for use in the microcellular network.

24. The system of claim 23, wherein said microcellular network includes a mobility server, and including an Ethernet link connected between an output of said mobility server and said input of said isolation interface.

25. The system of claim 24, wherein said mobility server and said isolation interface each include a TCP/IP application coupled to said Ethernet link.

* * * * *